United States Patent
Aziz et al.

(10) Patent No.: US 11,936,666 B1
(45) Date of Patent: Mar. 19, 2024

(54) RISK ANALYZER FOR ASCERTAINING A RISK OF HARM TO A NETWORK AND GENERATING ALERTS REGARDING THE ASCERTAINED RISK

(71) Applicant: FireEye, Inc., Milpitas, CA (US)

(72) Inventors: Ashar Aziz, Coral Gables, FL (US); Osman Abdoul Ismael, Palo Alto, CA (US)

(73) Assignee: Musarubra US LLC, Plano, TX (US)

( * ) Notice: Subject to any disclaimer, the term of this patent is extended or adjusted under 35 U.S.C. 154(b) by 187 days.

(21) Appl. No.: 17/146,417

(22) Filed: Jan. 11, 2021

Related U.S. Application Data

(63) Continuation of application No. 15/473,154, filed on Mar. 29, 2017, now Pat. No. 10,893,059.

(60) Provisional application No. 62/316,390, filed on Mar. 31, 2016.

(51) Int. Cl.
   *G06F 21/53* (2013.01)
   *H04L 9/40* (2022.01)
   *H04W 12/128* (2021.01)

(52) U.S. Cl.
   CPC .......... *H04L 63/1416* (2013.01); *G06F 21/53* (2013.01); *H04L 63/14* (2013.01); *H04L 63/145* (2013.01); *H04W 12/128* (2021.01)

(58) Field of Classification Search
   CPC ... H04L 63/1416; H04L 63/14; H04L 63/145; H04W 12/128; G06F 21/53
   See application file for complete search history.

(56) References Cited

U.S. PATENT DOCUMENTS

| | | | |
|---|---|---|---|
| 4,292,580 | A | 9/1981 | Ott et al. |
| 5,175,732 | A | 12/1992 | Hendel et al. |
| 5,319,776 | A | 6/1994 | Hile et al. |
| 5,440,723 | A | 8/1995 | Arnold et al. |

(Continued)

FOREIGN PATENT DOCUMENTS

| | | | |
|---|---|---|---|
| GB | 2439806 A | 1/2008 | |
| GB | 2490431 A | 10/2012 | |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.

(Continued)

*Primary Examiner* — Robert B Leung
*Assistant Examiner* — Howard H. Louie
(74) *Attorney, Agent, or Firm* — Rutan & Tucker, LLP

(57) ABSTRACT

Computerized techniques to determine and verify maliciousness of an object are described. A malware detection system intercepts in-bound network traffic at a periphery of a network to capture and analyze behaviors of content of network traffic monitored during execution in a virtual machine. One or more endpoint devices on the network also monitor for behaviors during normal processing. Correlation of the behaviors captured by the malware detection system and the one or more endpoint devices may verify a classification by the malware detection system of maliciousness of the content. The malware detection system may communicate with the one or more endpoint devices to influence detection and reporting of behaviors by those device(s).

16 Claims, 6 Drawing Sheets

(56) References Cited

U.S. PATENT DOCUMENTS

| | | |
|---|---|---|
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,321,338 B1 | 11/2001 | Porras et al. |
| 6,357,008 B1 | 3/2002 | Nachenberg |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,978,015 B1 | 12/2005 | Erickson et al. |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,188,367 B1 | 3/2007 | Edwards et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Vancic et al. |
| 7,356,736 B2 | 4/2008 | Natvig |
| 7,373,666 B2 | 5/2008 | Kaler et al. |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,600,007 B1 | 10/2009 | Lewis |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,500 B2 | 11/2010 | Nason et al. |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,178 B1 | 10/2011 | Fisher et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,056,136 B1 | 11/2011 | Zaitsev |
| 8,069,484 B2 | 11/2011 | McMillan et al. |
| 8,087,086 B1 | 12/2011 | Lai et al. |
| 8,095,964 B1 | 1/2012 | Zhong et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,181,247 B1 | 5/2012 | Pavlyushchik et al. |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |

(56) References Cited

U.S. PATENT DOCUMENTS

| | | |
|---|---|---|
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,388 B1 | 10/2013 | Wang et al. |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,621,632 B1 | 12/2013 | Smith et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,790 B1 | 7/2014 | Smith et al. |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,813,222 B1 | 8/2014 | Codreanu et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,850,584 B2 | 9/2014 | Alme et al. |
| 8,854,474 B2 | 10/2014 | Blumstein-Koren et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,955,138 B1 | 2/2015 | Mahadik et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,092,616 B2 | 7/2015 | Kumar et al. |
| 9,094,443 B1 | 7/2015 | Martini et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,148,441 B1 | 9/2015 | Tamersoy et al. |
| 9,159,035 B1 | 10/2015 | Ismael et al. |
| 9,166,997 B1 | 10/2015 | Guo et al. |
| 9,171,154 B2 | 10/2015 | Pereira |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,202,050 B1 | 12/2015 | Nachenberg |
| 9,203,862 B1 | 12/2015 | Kashyap et al. |
| 9,223,972 B1 * | 12/2015 | Vincent ............... H04L 63/1425 |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,280,663 B2 | 3/2016 | Pak et al. |
| 9,282,109 B1 | 3/2016 | Aziz et al. |
| 9,282,116 B1 | 3/2016 | Rovniaguin |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,332,029 B1 * | 5/2016 | Tikhonov ............... G06F 21/566 |
| 9,336,385 B1 | 5/2016 | Spencer et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,401,142 B1 | 7/2016 | Rothwell et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,578,064 B2 | 2/2017 | Ango et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,635,041 B1 | 4/2017 | Warman et al. |
| 9,641,544 B1 | 5/2017 | Treat et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,210 B1 * | 6/2017 | Oprea ................. H04L 63/1433 |
| 9,674,298 B1 | 6/2017 | Edwards et al. |
| 9,680,862 B2 | 6/2017 | Smael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,734,138 B2 | 8/2017 | Rothwell et al. |

(56) References Cited

U.S. PATENT DOCUMENTS

| | | |
|---|---|---|
| 9,736,179 B2 | 8/2017 | Ismael |
| 9,740,857 B2 | 8/2017 | Ismael et al. |
| 9,747,446 B1 | 8/2017 | Pidathala et al. |
| 9,749,294 B1 | 8/2017 | Marquardt et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Smael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,405 B1 | 12/2017 | Guo et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,960,975 B1 | 5/2018 | Van Horenbeeck et al. |
| 9,973,531 B1 | 5/2018 | Thioux |
| 9,977,895 B2 | 5/2018 | Danahy et al. |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,178,119 B1 | 1/2019 | Brandwine et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,200,866 B1 | 2/2019 | Cratsenburg et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,333,962 B1 | 6/2019 | Brandwine et al. |
| 10,454,950 B1 | 10/2019 | Aziz |
| 10,642,753 B1 | 5/2020 | Steinberg |
| 10,650,142 B1 | 5/2020 | Chen |
| 10,826,933 B1 | 11/2020 | Ismael et al. |
| 10,972,488 B2 | 4/2021 | Pal et al. |
| 11,182,476 B2 | 11/2021 | Mitelman et al. |
| 11,269,977 B2 | 3/2022 | Turgeman et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Achman et al. |
| 2002/0169952 A1 | 11/2002 | DiSanto et al. |
| 2002/0184528 A1 | 12/2002 | Shevenell et al. |
| 2002/0188887 A1 | 12/2002 | Argman et al. |
| 2002/0194489 A1 | 12/2002 | Almogy et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0016437 A1 | 1/2004 | Cobb et al. |
| 2004/0019832 A1 | 1/2004 | Arnold et al. |
| 2004/0024767 A1 | 2/2004 | Chen |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0133672 A1 | 7/2004 | Bhattacharya et al. |
| 2004/0165588 A1 | 8/2004 | Pandya |
| 2004/0193923 A1 | 9/2004 | Hammond et al. |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0060562 A1 | 3/2005 | Bhattacharya et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |

(56) References Cited

U.S. PATENT DOCUMENTS

| | | |
|---|---|---|
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101264 A1 | 5/2006 | Costea et al. |
| 2006/0101282 A1 | 5/2006 | Costea et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0137012 A1 | 6/2006 | Aaron |
| 2006/0143709 A1 | 6/2006 | Brooks et al. |
| 2006/0150249 A1 | 7/2006 | Gassen et al. |
| 2006/0156380 A1 | 7/2006 | Gladstone et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0008098 A1 | 1/2007 | Wong |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038677 A1 | 2/2007 | Reasor et al. |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0089165 A1 | 4/2007 | Wei et al. |
| 2007/0094730 A1 | 4/2007 | Bhikkaji et al. |
| 2007/0101435 A1 | 5/2007 | Konanka et al. |
| 2007/0121596 A1 | 5/2007 | Kurapati et al. |
| 2007/0128855 A1 | 6/2007 | Cho et al. |
| 2007/0130319 A1 | 6/2007 | Tse et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0192866 A1 | 8/2007 | Sagoo et al. |
| 2007/0198275 A1 | 8/2007 | Malden et al. |
| 2007/0208822 A1 | 9/2007 | Wang et al. |
| 2007/0209074 A1 | 9/2007 | Coffman |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256127 A1 | 11/2007 | Kraemer et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0005797 A1 | 1/2008 | Field et al. |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0047013 A1 | 2/2008 | Claudatos et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0244742 A1 | 10/2008 | Neystadt et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0138303 A1 | 5/2009 | Seshadri |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0282478 A1 | 11/2009 | Jiang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |

(56) References Cited

U.S. PATENT DOCUMENTS

| | | |
|---|---|---|
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0071051 A1* | 3/2010 | Choyi .................. H04L 63/145 726/12 |
| 2010/0077481 A1 | 3/2010 | Polyakov et al. |
| 2010/0083376 A1 | 4/2010 | Pereira et al. |
| 2010/0094459 A1 | 4/2010 | Cho et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Smael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281540 A1* | 11/2010 | Alme .................... G06F 21/563 726/23 |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Ståhlberg |
| 2011/0047594 A1 | 2/2011 | Mahaffey et al. |
| 2011/0047597 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0055925 A1 | 3/2011 | Jakobsson |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0191849 A1* | 8/2011 | Jayaraman .......... H04L 63/1416 715/205 |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0288692 A1 | 11/2011 | Scott |
| 2011/0289582 A1 | 11/2011 | Kejriwal et al. |
| 2011/0302587 A1 | 12/2011 | Nishikawa et al. |
| 2011/0302656 A1 | 12/2011 | El-Moussa |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0030750 A1 | 2/2012 | Bhargava et al. |
| 2012/0036576 A1 | 2/2012 | Iyer |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0254995 A1 | 10/2012 | Sallam |
| 2012/0255001 A1 | 10/2012 | Sallam |
| 2012/0255003 A1 | 10/2012 | Sallam |
| 2012/0255004 A1 | 10/2012 | Sallam |
| 2012/0255012 A1 | 10/2012 | Sallam |
| 2012/0255013 A1 | 10/2012 | Sallam |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0304244 A1 | 11/2012 | Xie et al. |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0042294 A1 | 2/2013 | Colvin et al. |
| 2013/0047257 A1 | 2/2013 | Aziz |
| 2013/0074185 A1 | 3/2013 | McDougal et al. |
| 2013/0086247 A1 | 4/2013 | Burckart et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0145463 A1 | 6/2013 | Ghosh et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298192 A1 | 11/2013 | Kumar et al. |
| 2013/0298243 A1 | 11/2013 | Kumar et al. |
| 2013/0303154 A1 | 11/2013 | Gupta et al. |
| 2013/0304869 A1 | 11/2013 | Gupta et al. |
| 2013/0305369 A1 | 11/2013 | Karta et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0340080 A1 | 12/2013 | Gostev et al. |
| 2014/0007238 A1 | 1/2014 | Magee et al. |
| 2014/0013434 A1 | 1/2014 | Ranum et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0068769 A1 | 3/2014 | Neil |
| 2014/0130158 A1 | 5/2014 | Wang et al. |
| 2014/0130161 A1 | 5/2014 | Golovanov |
| 2014/0137180 A1 | 5/2014 | Lukacs et al. |
| 2014/0157405 A1 | 6/2014 | Joll et al. |
| 2014/0169762 A1 | 6/2014 | Ryu |
| 2014/0179360 A1 | 6/2014 | Jackson et al. |
| 2014/0181131 A1 | 6/2014 | Ross |

(56) References Cited

U.S. PATENT DOCUMENTS

| | | |
|---|---|---|
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0215608 A1 | 7/2014 | Rajagopalan et al. |
| 2014/0237600 A1 | 8/2014 | Silberman et al. |
| 2014/0245374 A1 | 8/2014 | Deerman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0283066 A1 | 9/2014 | Teddy et al. |
| 2014/0289323 A1 | 9/2014 | Kutaragi et al. |
| 2014/0328204 A1 | 11/2014 | Klotsche et al. |
| 2014/0337836 A1 | 11/2014 | Ismael |
| 2014/0337862 A1 | 11/2014 | Valencia et al. |
| 2014/0344926 A1 | 11/2014 | Cunningham et al. |
| 2014/0351935 A1 | 11/2014 | Shao et al. |
| 2014/0373155 A1 | 12/2014 | Whitehouse et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0007325 A1 | 1/2015 | Eliseev et al. |
| 2015/0047046 A1 | 2/2015 | Pavlyushchik |
| 2015/0067862 A1 | 3/2015 | Yu et al. |
| 2015/0067866 A1 | 3/2015 | Ibatullin et al. |
| 2015/0074806 A1 | 3/2015 | Roundy et al. |
| 2015/0096022 A1 | 4/2015 | Vincent et al. |
| 2015/0096023 A1* | 4/2015 | Mesdaq ............ H04L 63/1416 726/23 |
| 2015/0096024 A1 | 4/2015 | Haq et al. |
| 2015/0096025 A1 | 4/2015 | Ismael |
| 2015/0101047 A1 | 4/2015 | Sridhara et al. |
| 2015/0101048 A1 | 4/2015 | Sridhara et al. |
| 2015/0106942 A1 | 4/2015 | Borghetti et al. |
| 2015/0121524 A1 | 4/2015 | Fawaz et al. |
| 2015/0150130 A1 | 5/2015 | Fiala et al. |
| 2015/0161386 A1 | 6/2015 | Gupta et al. |
| 2015/0163121 A1 | 6/2015 | Mahaffey et al. |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0205962 A1 | 7/2015 | Swidowski et al. |
| 2015/0220734 A1 | 8/2015 | Nalluri et al. |
| 2015/0220735 A1 | 8/2015 | Paithane et al. |
| 2015/0244730 A1* | 8/2015 | Vu ..................... G06F 21/566 726/24 |
| 2015/0288659 A1 | 10/2015 | Lukacs et al. |
| 2015/0327518 A1 | 11/2015 | Han et al. |
| 2015/0365427 A1 | 12/2015 | Ben-Shalom et al. |
| 2015/0372980 A1 | 12/2015 | Eyada |
| 2016/0004869 A1 | 1/2016 | Ismael et al. |
| 2016/0006756 A1 | 1/2016 | Smael et al. |
| 2016/0014159 A1 | 1/2016 | Schrecker et al. |
| 2016/0019388 A1 | 1/2016 | Singla et al. |
| 2016/0034361 A1 | 2/2016 | Block et al. |
| 2016/0044000 A1 | 2/2016 | Cunningham |
| 2016/0065601 A1 | 3/2016 | Gong et al. |
| 2016/0078225 A1 | 3/2016 | Ray et al. |
| 2016/0078229 A1 | 3/2016 | Gong et al. |
| 2016/0078347 A1 | 3/2016 | Salajegheh et al. |
| 2016/0080345 A1 | 3/2016 | Safruti et al. |
| 2016/0080413 A1 | 3/2016 | Smith et al. |
| 2016/0080417 A1 | 3/2016 | Thomas et al. |
| 2016/0080418 A1 | 3/2016 | Ray et al. |
| 2016/0080420 A1 | 3/2016 | Ray et al. |
| 2016/0092682 A1 | 3/2016 | Adams et al. |
| 2016/0099963 A1 | 4/2016 | Mahaffey et al. |
| 2016/0112451 A1 | 4/2016 | Jevans |
| 2016/0127367 A1 | 5/2016 | Jevans |
| 2016/0127393 A1 | 5/2016 | Aziz et al. |
| 2016/0127406 A1 | 5/2016 | Smith et al. |
| 2016/0142432 A1 | 5/2016 | Manadhata et al. |
| 2016/0164960 A1 | 6/2016 | Marinelli et al. |
| 2016/0173509 A1 | 6/2016 | Ray et al. |
| 2016/0173510 A1 | 6/2016 | Harris et al. |
| 2016/0191465 A1 | 6/2016 | Thomas et al. |
| 2016/0191547 A1 | 6/2016 | Zafar et al. |
| 2016/0191550 A1 | 6/2016 | Ismael et al. |
| 2016/0205138 A1 | 7/2016 | Krishnaprasad |
| 2016/0232353 A1 | 8/2016 | Gupta et al. |
| 2016/0253498 A1 | 9/2016 | Valencia et al. |
| 2016/0261465 A1 | 9/2016 | Gupta et al. |
| 2016/0261612 A1 | 9/2016 | Mesdaq et al. |
| 2016/0285897 A1 | 9/2016 | Gantman et al. |
| 2016/0285914 A1 | 9/2016 | Singh et al. |
| 2016/0301703 A1 | 10/2016 | Aziz |
| 2016/0301704 A1 | 10/2016 | Hassanzadeh et al. |
| 2016/0301709 A1 | 10/2016 | Hassanzadeh et al. |
| 2016/0314298 A1 | 10/2016 | Martini et al. |
| 2016/0323295 A1 | 11/2016 | Joram et al. |
| 2016/0323304 A1 | 11/2016 | Terada et al. |
| 2016/0335110 A1 | 11/2016 | Paithane et al. |
| 2016/0359890 A1 | 12/2016 | Deen et al. |
| 2016/0379136 A1 | 12/2016 | Chen et al. |
| 2016/0381057 A1 | 12/2016 | Das et al. |
| 2017/0017537 A1 | 1/2017 | Razin et al. |
| 2017/0026949 A1 | 1/2017 | Ouyang et al. |
| 2017/0046510 A1 | 2/2017 | Chen et al. |
| 2017/0083703 A1 | 3/2017 | Abbasi et al. |
| 2017/0083705 A1 | 3/2017 | Lee et al. |
| 2017/0093899 A1 | 3/2017 | Horesh et al. |
| 2017/0118241 A1 | 4/2017 | Call et al. |
| 2017/0149804 A1 | 5/2017 | Kolbitsch et al. |
| 2017/0171235 A1 | 6/2017 | Mulchandani et al. |
| 2017/0195347 A1 | 7/2017 | Hay et al. |
| 2017/0223046 A1 | 8/2017 | Singh |
| 2017/0243000 A1 | 8/2017 | Shraim et al. |
| 2017/0249560 A1 | 8/2017 | Cudak et al. |
| 2017/0272453 A1 | 9/2017 | Murray et al. |
| 2017/0316206 A1 | 11/2017 | Zou et al. |
| 2018/0013770 A1 | 1/2018 | Ismael |
| 2018/0048660 A1 | 2/2018 | Paithane et al. |
| 2018/0096142 A1* | 4/2018 | Xu ........................ G06F 40/205 |
| 2018/0121316 A1 | 5/2018 | Ismael et al. |
| 2018/0176247 A1 | 6/2018 | Smith et al. |
| 2018/0189484 A1 | 7/2018 | Danahy et al. |
| 2018/0288077 A1 | 10/2018 | Siddiqui et al. |
| 2018/0322286 A1 | 11/2018 | Diehl et al. |
| 2019/0081967 A1 | 3/2019 | Balabine |
| 2022/0038483 A1 | 2/2022 | George et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector-Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xp/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

(56) References Cited

OTHER PUBLICATIONS

Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/id-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets—11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Thomas H. Placek, and Timothy N. Newsham , "Insertion, Evasion, and Denial of Service: Eluding Network Intrusion Detection", Secure Networks, ("Ptacek"), (Jan. 1998).
U.S. Appl. No. 15/258,656, filed Sep. 7, 2016 Advisory Action dated Jan. 31, 2019.
U.S. Appl. No. 15/258,656, filed Sep. 7, 2016 Final Office Action dated Oct. 26, 2018.
U.S. Appl. No. 15/258,656, filed Sep. 7, 2016 Final Office Action dated Sep. 18, 2019.
U.S. Appl. No. 15/258,656, filed Sep. 7, 2016 Non-Final Office Action dated Apr. 6, 2018.
U.S. Appl. No. 15/258,656, filed Sep. 7, 2016 Non-Final Office Action dated Jan. 31, 2020.
U.S. Appl. No. 15/258,656, filed Sep. 7, 2016 Non-Final Office Action dated May 30, 2019.
U.S. Appl. No. 15/258,656, filed Sep. 7, 2016 Notice of Allowance dated May 27, 2020.

(56) References Cited

OTHER PUBLICATIONS

U.S. Appl. No. 15/473,154, filed Mar. 29, 2017 Final Office Action dated Apr. 29, 2019.
U.S. Appl. No. 15/473,154, filed Mar. 29, 2017 Non-Final Office Action dated Feb. 26, 2020.
U.S. Appl. No. 15/473,154, filed Mar. 29, 2017 Non-Final Office Action dated Nov. 29, 2018.
Venezia, Paul , "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
U.S. Appl. No. 17/087,550, filed Nov. 2, 2020 Final Office Action dated Nov. 4, 2022.
U.S. Appl. No. 17/087,550, filed Nov. 2, 2020 Non-Final Office Action dated Jun. 24, 2022.
U.S. Appl. No. 17/087,550, filed Nov. 2, 2020 Final Office Action dated Oct. 6, 2023.
U.S. Appl. No. 17/087,550, filed Nov. 2, 2020 Notice of Allowance dated Dec. 26, 2023.

\* cited by examiner

RISK ANALYZER FOR ASCERTAINING A RISK OF HARM TO A NETWORK AND GENERATING ALERTS REGARDING THE ASCERTAINED RISK

RELATED APPLICATION

The present application is a continuation of U.S. patent application Ser. No. 15/473,154 filed Mar. 29, 2017, now U.S. Pat. No. 10,893,059 issued Jan. 12, 2021, which claims priority from commonly owned Provisional Patent Application Ser. No. 62/316,390 filed on Mar. 31, 2016, the contents of which are incorporated herein by reference.

FIELD OF THE INVENTION

The present invention relates generally to cyber security and more particularly to verifying and enhancing detection of a cyber-attack on a network.

BACKGROUND OF THE INVENTION

A cyber-attack may employ malware (malicious software), which may include a computer program or file that is harmful to a computer, computer network, and/or user. Conventional antivirus applications may be employed at computers, such as, for example, laptops and servers connectable as nodes (e.g., endpoints) of a network, to identify viruses and other malware using a signature-based approach. Antivirus applications identify malware using an antivirus engine that compares the contents of a file to a database of known malware signatures. Advanced malware often avoids detection by antivirus applications. Advanced malware is often polymorphic in nature, that is, changes its "fingerprint" while maintaining its central malicious functionality, thus avoiding matches against the signature database. Also, advanced malware is often custom-designed for use against targeted users, organizations or industries and not re-used against other targets. As such, targeted malware will often not match signatures of known generic malware. Given that advanced malware is able to circumvent conventional antivirus analysis, this approach has been determined to be wholly deficient.

Another solution employs a malware detection system to identify malware at the network periphery. In some solutions, detection at the network periphery may utilize a conventional network intrusion detection system (IDS) often incorporated into network firewalls to compare signatures of known malware against traffic for matches while, in other solutions, a two-phase network security appliance (NSA) may be employed. The two-phase approach may compare in-bound network traffic against known characteristics of malware in a static analysis phase and identify malicious behaviors during execution of the content in a dynamic analysis phase.

Detection at the network periphery may be limited by the capability of the malware detection system for precise and effective detection without excessive false positives (wrongly identified attacks) on the one hand (such as is often the case with IDSs), and for timely analysis of behaviors of the network traffic to completely prevent network intrusion on the other (such as may be the case with some NSAs under certain circumstances). Furthermore, the analysis at the network periphery may not provide sufficient information about the particular target or targets (e.g., endpoints) within the network and the potential scope and severity of the attack.

Moreover, the proliferation of malware detection systems and security software has inundated network administrators with security alerts. Actionable intelligence may be buried within these security alerts; however, the sheer number of the alerts makes it difficult for network administrators to identify high priority alerts, a situation exacerbated by the presence of false positives. Moreover, the alerts may not contain sufficient information regarding the progression of the attack once inside the network. Accordingly, a network manager may be unable to identify whether a cyber-attack is in progress or has even occurred and to determine appropriate and timely actions to contain and remediate potential damage.

SUMMARY OF EMBODIMENTS OF THE INVENTION

Aspects of the invention reside in the interoperation of malware detection capabilities of a first network electronic device located for detection at a network periphery and a second network electronic device located for detection at a network node or endpoint device (an "endpoint device") to verify the presence of a cyber-attack and otherwise to enhance malware detection. The first network electronic device may be embodied as a malware detection system (MDS), for example, an NSA, which receives inbound network traffic (or at least objects contained within the traffic) at the network periphery for analysis to identify those objects containing malware and thereby constituting cyber-attacks. For this purpose, embodiments of the MDS may include an object capture device at or near the periphery of the network and an object analysis component (locally or remotely situated, e.g., in the cloud) for detecting features (e.g., characteristics and/or behaviors) associated with malware. Analysis results of the MDS may be communicated to the endpoint device to guide or influence malware detection on-board the endpoint device. The results of malware detection by the MDS and the endpoint device (the respective "analysis results") may be correlated to verify and enhance malware detection.

Correlation of the respective analysis results and classification of the object as malicious or benign may be performed by a security logic engine ("SLE"). This SLE may be implemented for example as part of the MDS or in a separate network device such as, for example, a security management console or system. More specifically, the SLE may verify a cyber-attack by synthesizing (combining) the analysis results of the MDS with the analysis results of at least one endpoint device though in many cases with a possibly large group of endpoint devices. The synthesis of the analysis results may enhance the detection of the cyber-attack by identifying further information of the attack.

For example, if an MDS operating at the periphery of a network determines an object contained in network traffic entering the network is likely malicious by analyzing the traffic and in particular the object, the MDS may communicate the results of the analysis to a SLE. In an embodiment, the MDS may utilize a static analysis logic (operable without executing the object) and a dynamic analysis logic (operable to perform behavioral analysis that involves executing the object) to generate analysis results. The SLE (which may be a component of the MDS in some embodiments) may combine the results of the static and dynamic analyses to classify the object as malicious or benign. In addition, to verify the cyber-attack identified by the MDS, an endpoint device (e.g., the endpoint device receiving the network traffic containing malicious object) may monitor the processing of the object during execution to identify characteristics and behaviors to enhance the MDS/SLE determination of maliciousness.

The endpoint device may be configured to monitor the behaviors of objects processed by the device with a view to identifying anomalous behaviors which may be indicative of malware. In an embodiment, the endpoint device processes, e.g., loads the object or otherwise executes the object during its normal operation (e.g. user-initiated processing of a document file, etc.). The endpoint device may collect "events," that is, information regarding behaviors monitored during processing, and may communicate the events to a SLE to enhance cyber-attack detection. In some embodiments, the endpoint device may include a software agent that monitors the events and, in some embodiments, determines whether the events represent anomalous behaviors. Anomalous behaviors may include unexpected or undesired behaviors (e.g., file accesses, system resource accesses) or unwanted operations that would be acceptable in another context (e.g., locking access to the endpoint device). The endpoint device may communicate the events or just the anomalous behavioral information to the SLE logic for further correlation and classification of the object.

The SLE logic receives analysis results from the MDS and from one or more endpoint devices in the network to verify a cyber-attack by correlating the analysis results from the MDS against those of the one or more endpoint devices. The correlation may result in a threat score or other threat level of maliciousness. Where the correlation score or level exceeds a prescribed first threshold, the determination by the MDS of the object as malware is verified. In some embodiments, the SLE may alternatively or in addition correlate the analysis results from the MDS and the one or more endpoint devices with features associated with known malware to classify the object as malware (or re-classify the object as malware, where the MDS had originally classified the object as merely suspicious) where the correlation score or indicator exceeds a prescribed second threshold, which may be the same or different than the first threshold. Where the MDS determines the malicious object is associated with a select threat level or maliciousness score that level or score may be increased or decreased based on this additional correlation with the features of one or more endpoints and/or of known malware.

In some embodiments the SLE may seek classification of the object as malware as just described, and further, in some embodiments, classify the object as being part of a family of malware based on the combined features of the analysis results of the MDS and the one or more endpoint devices by correlating those analytical results against those of known malware families. Accordingly, this SLE may label the object with the name of a known malware and/or a known family of malware. In some cases, the SLE may extend a known family to encompass an additional malware by adding the features of the object under analysis to the malware family.

In an embodiment, the SLE may combine the analytical results from the MDS and the one or more endpoint devices to obtain further information regarding the nature and extent of a cyber-attack. For this, the SLE determines whether the analysis results from the endpoint device(s) reflect additional features of an attack, additional identification of vulnerable software running on the endpoint device(s) (beyond that running for example in a detection environment on the MDS), or other additional attack context (metadata). The attack context may also include, for example, the target (data, system or human) of the attack, the ultimate purpose of the attack (e.g., data exfiltration), a timestamp indicating when a detection was made at the MDS and each endpoint device, etc. By correlating analytical results from a plurality of endpoint devices, the SLE may determine one or more of the following: hallmarks of related attacks on the network, spreading of malware (infection/compromise) from one endpoint device to another (lateral spread), patient zero (the first endpoint device infected, which may or may not be the destination of the network traffic containing the object), whether the attack represents an Advanced Persistent Threat (APT) or other kind of targeted attack, and/or network or device vulnerable to the cyber-attack. In some embodiments, the SLE may trace the spread of an infection through a network by, for example, comparing the timestamps of verified malicious objects. The compared timestamps of verified malicious objects may be mapped chronologically to identify the patient-zero.

The SLE may issue an alert, e.g., over a network, to a security administrator based on verification of a cyber-attack. The alert may include information providing an assessment of the risk posed by the cyber-attack, information regarding the features of malware involved in the cyber-attack, identification of the endpoint device or devices involved in the attack, and related information such as software executing on the endpoint device found to be affected or vulnerable. In some embodiments, the SLE alert may enhance or modify information contained in an alert previously issued by the malware detection system and/or endpoint device based on the synthesis of the results.

In some embodiments, the MDS or SLE may communicate to an endpoint device receiving the malicious object (e.g., the endpoint device that was the original destination of the network traffic containing the object) to provide information regarding detected malware features and other attack context (including, for example, indicators of compromise (IOCs)). For example, the MDS or SLE may provide the attack context including IOCs to monitoring logic of an agent on the endpoint device to configure and improve monitoring capabilities of the endpoint device during processing of the object. The MDS or SLE may provide all or a select portion of the attack context, and may do so automatically and, in some embodiments, selectively when a threat level or maliciousness score exceeds a threshold. The configuration of the monitoring logic of the agent may enable or disable select monitoring in the endpoint device, for example, to focus detection on the features (e.g., statically identified characteristics and/or behaviors of the object) identified by the MDS or SLE. The agent may also cause priority or expedited communication to the SLE of detected suspicious or malicious behavior in response to the received attack context, e.g., rather than awaiting polling by the SLE or other periodic reporting. To that end, embodiments advantageously employ a configurable agent, e.g., an agent with multiple or adaptable monitoring functions.

In some embodiments the features collected by the MDS and endpoint device(s) may be used to determine cyber vulnerability, including vulnerability of the network and/or of specific endpoint devices within the network. To that end, embodiments may collect information regarding an attack from a group of endpoint devices, for example, distributed across the network, and correlate that information with the information from the MDS. The collection may be made directly from the endpoint devices themselves or indirectly, such as via a conventional Security Information and Event Manager (SIEM) that aggregates the results from the endpoint devices. Moreover, embodiments may collect attack information from endpoint devices running the same software (software profile) as that used by a detection environment of the MDS to detect the attack, and/or may run different software to scope the range of software susceptible or vulnerable to the attack. Moreover, by correlating the collected features with known malware or known malware families, a malicious object may be classified and labeled with the malware name and/or as being part of a named malware family. The MDS or SLE may determine the software configuration(s) susceptible to the malware or malware family. The system may identify endpoint devices vulnerable to the malware or malware family and initiate or transmit an alert, for example, an email, text or other communication signal, to a security administrator referencing those endpoint devices.

In some embodiments, when a threat to the network is identified, the system may issue a special action alert to devices on the network to instigate preventive or remedial action, such as to block or terminate processing of a known malicious object. By terminating processing of the known malicious object, the system may prevent lateral propagation of the malicious object, e.g. the malicious object moving from one endpoint device to another endpoint device. To further prevent lateral propagation, the system may instruct a potentially compromised endpoint device to block select outbound communications, such as those over select network ports.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DETAILED DESCRIPTION OF THE INVENTION

Figure 1:
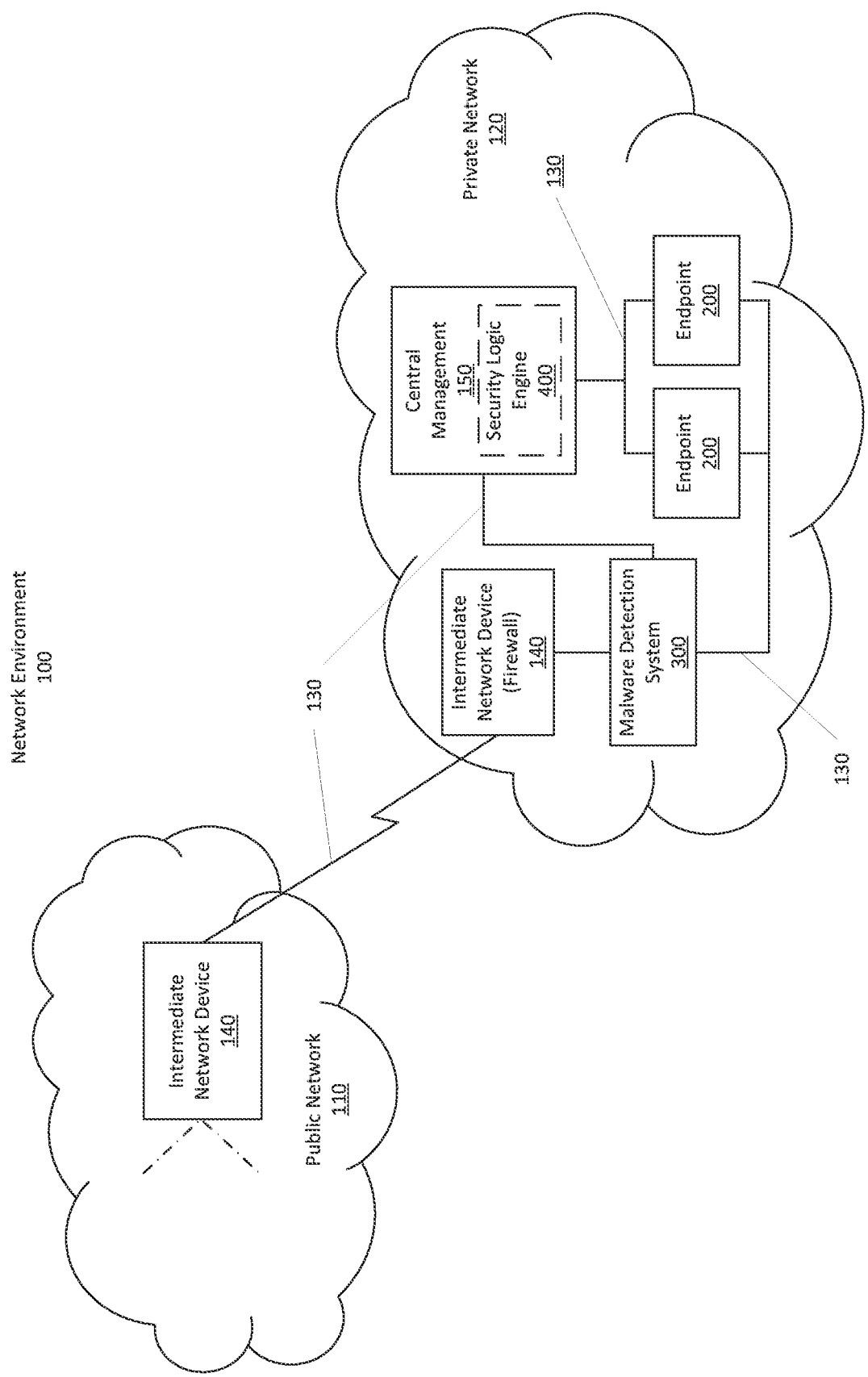
FIG. 1 is a block diagram of a network environment in accordance with one or more embodiments described herein.

FIG. 1 is a block diagram of a network environment 100 that may be advantageously used with one or more embodiments described herein. The network environment 100 may be organized as a plurality of networks, such as a public network 110 and/or a private network 120 (e.g., an organization or enterprise network). According to this embodiment, the public network 110 and the private network 120 are communicatively coupled via network interconnects 130, and provide network connectivity and communication to intermediary computing devices 140, such as network switches, routers and/or firewalls, one or more endpoint device(s) 200, a malware detection system (MDS) 300 and a security logic engine 400.

The intermediary computing devices 140 communicate by exchanging packets or messages (i.e., network traffic) according to a predefined set of protocols, such as the Transmission Control Protocol/Internet Protocol (TCP/IP). However, it should be noted that other protocols, such as the HyperText Transfer Protocol Secure (HTTPS) for example, may be advantageously used with the inventive aspects described herein. In the case of private network 120, the intermediary computing device 140 may include a firewall or other computing device configured to limit or block certain network traffic in an attempt to protect the endpoint devices 200 from unauthorized users and attacks. The endpoint device 200 is communicatively coupled with the security logic engine 400 by the network interconnects 130, and may provide metadata monitored and stored by the endpoint device 200 to the security logic engine 400. The malware detection system 300, security logic engine 400, and optionally one or more intermediary network device 140 are similarly connected by interconnects 130.

Figure 2:
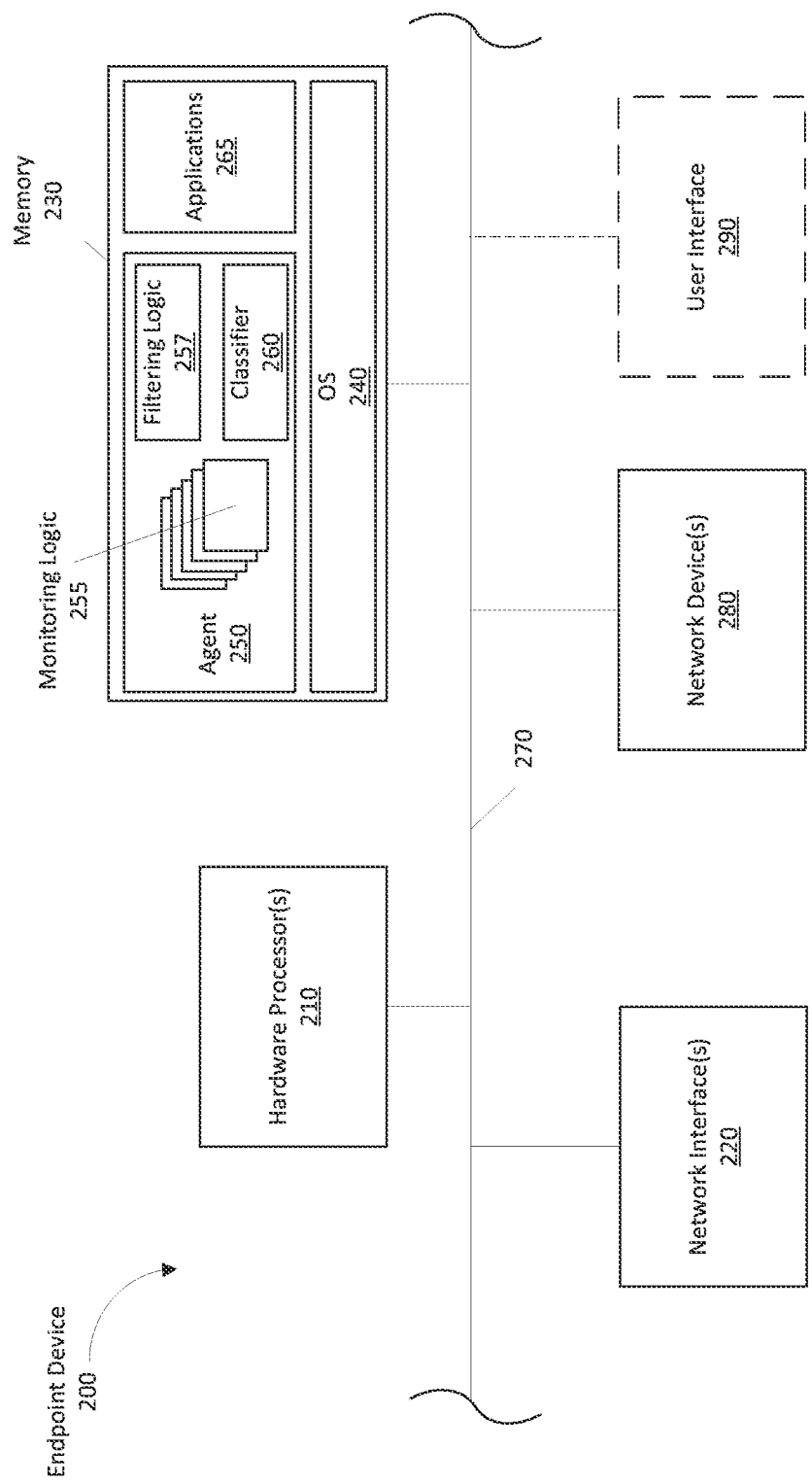
FIG. 2 is a block diagram of an endpoint device architecture in accordance with one or more embodiments described herein.

As illustrated in FIG. 2 in greater detail, the endpoint device 200 has physical hardware including hardware processors 210, network interface(s) 220, a memory 230, a system interconnect 270, and optionally, a user interface 290. The memory 230 may contain software comprising an operating system (OS) 240, one or more applications 265, an agent 250, event processing and filtering logic 257, and, in some embodiments, an endpoint device classifier 260. The physical hardware (e.g. hardware processors 210, network interfaces(s) 220, memory 230) may be connected for communication by the system interconnect 270, such as a bus. Generally speaking, an endpoint device 200 is a network-connected electronic device, such as a general purpose personal computer, laptop, smart phone, tablet or specialized device such as point of sale (POS) terminal and server.

The hardware processor 210 is a multipurpose, programmable device that accepts digital data as input, processes the input data according to instructions stored in its memory, and provides results as output. One example of the hardware processor 210 is an Intel®microprocessor with its associated instruction set architecture, which is used as a central processing unit (CPU) of the endpoint device 200. Alternatively, the hardware processor 210 may include another type of CPU, a digital signal processor (DSP), an application specific integrated circuit (ASIC), or the like.

The network device(s) 280 may include various input/output (I/0) or peripheral devices, such as a storage device, for example. One type of storage device may include a solid state drive (SSD) embodied as a flash storage device or other non-volatile, solid-state electronic device (e.g., drives based on storage class memory components). Another type of storage device may include a hard disk drive (HDD). Each network device 280 may include one or more network ports containing the mechanical, electrical and/or signaling circuitry needed to connect the endpoint device 200 to the private network 120 to thereby facilitate communications over the system network 100. To that end, the network interface(s) 220 may be configured to transmit and/or receive messages using a variety of communication protocols including, inter alfa, TCP/IP and HTTPS. The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The memory 230 may include a plurality of locations that are addressable by the hardware processor 210 and the network interface(s) 220 for storing software (including software applications) and data structures associated with such software. The hardware processor 210 is adapted to manipulate the stored data structures as well as execute the stored software, which includes an operating system (OS) 240, one or more applications 265, an agent 250, and an endpoint device classifier 260.

The operating system (OS) 240 is software that manages hardware (e.g., hardware processors 210, network interface(s) 220, memory 230, network device(s) 280, etc.), software resources, and provides common services for computer programs, such as applications 265. For hardware functions such as input and output (I/O) and memory allocation, the operating system 240 acts as an intermediary between applications 265 and the computer hardware, although the application code is usually executed directly by the hardware and frequently makes system calls to an OS function or be interrupted by it.

The agent 250 is an executable software component configured to monitor the behavior of the applications 265 and/or operating system 240. The agent 250 may be configured to monitor (via monitoring logic 255), and store metadata (e.g., state information, memory accesses, process names, time stamp, etc.) associated with content executed at the endpoint device and/or behaviors (sometimes referred to as "events") that may be associated with processing activity. Events are behaviors of an object that are processed by one of the user mode processes and are monitored by the agent 250. Examples of these events may include information associated with a newly created process (e.g., process identifier, time of creation, originating source for creation of the new process, etc.), information about the type and location of certain data structures, information associated with an access to certain restricted port or memory address, or the like. The agent 250 may also retrieve and communicate off the endpoint device 200 to a remote electronic device such as the SLE 400 context information such as the contents of the endpoint device's memory or hard drive, and could potentially be configured to modify the contents, such as state information. Moreover, the monitoring logic 255 may be configurable so as to enable or disable the monitoring of select behaviors, activities or processes. In some embodiments, the agent 250 may include an event processing and filtering logic 257, which, for example, applies heuristics, rules or other conditions to the monitored behaviors, to identify anomalous or unexpected behaviors. The processing and filtering logic 257, in some embodiments, may scan content being processed for matches with indicators (signatures). Also, in some embodiments, the agent 250 is configured to provide the events including the metadata to the endpoint device classifier 260 so as to classify the behaviors as suspicious or even malicious. Further information regarding an embodiment of an agent may be had with reference to U.S. Pat. No. 8,949,257 issued Feb. 3, 2015, entitled "Method and System for Collecting and Organizing Data Corresponding to an Event," the full disclosure of which being incorporated herein by reference.

The agent 250 may receive from the security logic engine 400 and/or malware detection system 300 a communication identifying a malicious object for elevated monitoring or certain specified behaviors, activities or processes to monitor. The communication identifying the malicious object may, by way of example, include a signatures ("fingerprint"), indicators, and/or patterns or sequences of behaviors. Elevated monitoring of the suspicious object may include modifying system settings or configuring the agent 250. System setting modification may include activating additional system monitors (via the monitoring logic 255) to further observe suspicious object execution and expediting communications of detection results to the SLE.

The agent 250 may provide metadata related to the monitored behaviors to the endpoint device classifier or classification engine 260 for classification of an object, e.g., as to threat level. The threat level may be indicated by the classifier 260 in any of various ways, such as indicating the object as malicious or suspicious, where "suspicious" imports less certainty or a lower threat level than a classification of "maliciousness." The agent 250 and classifier 260 may cooperate to analyze and classify certain observed behaviors of the object, based on monitored events, as indicative of malware. The classifier 260 may also be configured to classify the monitored behaviors as expected and unexpected/anomalous, such as memory access violations, in comparison with behaviors of known malware and known benign content as identified through the use of machine learning techniques and experiential knowledge.

In some embodiments, the agent 250 may utilize rules and heuristics to identify the anomalous behaviors of objects processed by the endpoint device 200. Examples of an anomalous behavior may include a communication-based anomaly, such as an unexpected attempt to establish a network communication, unexpected attempt to transfer data (e.g., GPS data or other location data resulting in a privacy violation, contact lists, etc.), or an anomalous behavior may include an execution anomaly, for example, an unexpected execution of computer program code, an unexpected Application Programming Interface (API) function call, an unexpected alteration of a registry key, or the like. The endpoint device monitoring rules may updated to improve the monitoring capability of the agent 250.

The endpoint device monitoring rules may be periodically or aperiodically updated, with the updates received by the agent 250 from the malware detection system 200 and/or the security logic engine 400. The update may include new or modified event monitoring rules and may set forth the behaviors to monitor. The monitoring logic 255 may be configured to implement the monitoring rules received by the endpoint device agent 250. For example, the agent 250 may be updated with new behavioral monitoring rules which may be provided to the monitoring logic 255, the monitoring logic configures the monitors with the monitoring rules received by the agent 250 for a certain running process or certain application 265, for example, to monitor for spawned additional processes. Alternatively, the behavioral monitoring rules may be received by the endpoint device 200 in response to a request from the endpoint device 200 to determine whether new rules are available, and in response, the new rules are downloaded by the endpoint device 200, provided to the agent 250, used to configure the monitoring logic 255.

In some embodiments an endpoint device 200 may include a separate user interface 290. The user interface 290 may produce a graphical or textual based representation to a user of the endpoint device 200. The user interface 290 provides the user with the ability to interact with the computer. The user interface 290 may not be present for an endpoint device that is not dedicated to a single user or does not require the interaction with a user.

Malware Detection System

Figure 3:
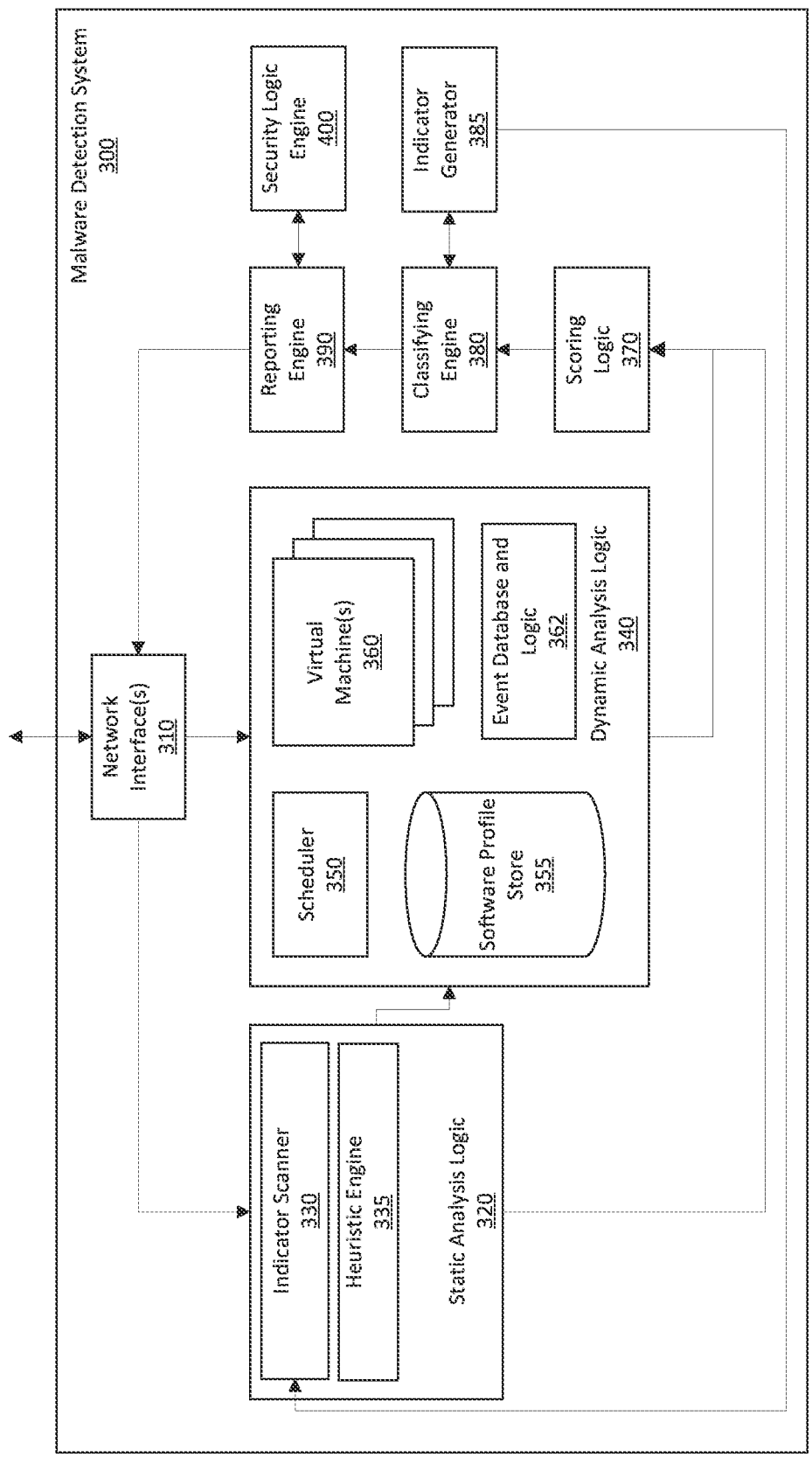
FIG. 3 is a block diagram of a malware detection system (MDS) in accordance with one or more embodiments described herein.

Referring now to FIG. 3, the malware detection system 300 can be implemented as a network security appliance. As used herein, an appliance may be embodied as any type of general-purpose or special-purpose computer, including a dedicated computing device, adapted to implement a variety of software architectures relating to exploit and malware detection and related functionality. The term "appliance" should therefore be taken broadly to include such arrangements, in addition to any systems or subsystems configured to support such functionality, whether implemented in one or more network computing devices or other electronic devices, equipment, systems or subsystems. Generally speaking, the malware detection system 300 may be implemented as one or more network-connected electronic devices, which each includes physical hardware comprising hardware processor(s), network interface(s), a memory, a system interconnect, an optional user interface, a system interconnect, which may be arranged and organized as shown in FIG. 2. Accordingly, each of the components of the malware detection system 300 shown in FIG. 3 and described below may be implemented as one or more computer programs or modules executable on one or more processors and stored in memory.

As thus embodied, the malware detection system 300 includes a network interface(s) 310, a static analysis logic 320 comprising at least an indicator scanner 330, and a heuristics engine 335, a dynamic analysis logic 340 comprising at least a scheduler 350, a store of software profiles 355, and one or more virtual machine(s) 360, an event database and logic 362, a classifying engine 380, an indicator generator 385, and a reporting engine 390. The malware analysis may involve static, dynamic and/or an optional emulation analysis, as generally described in U.S. Pat. No. 9,223,972, the entire contents of which are incorporated by reference.

The network interface(s) 310 may receive and capture network traffic transmitted from multiple devices without appreciably affecting the performance of the private network 120 or the devices coupled to the private network 120. In one embodiment, the malware detection system 300 may capture objects contained in network traffic using the network interface(s) 310, make a copy of the objects, pass the objects to the appropriate endpoint device(s) 200 and pass the copy of the objects to the static analysis logic 320 and/or the dynamic analysis logic 340. In another embodiment, the malware detection system 300 may capture the objects using the network interface(s) 310 and pass the objects to the static analysis logic 320 and/or the dynamic analysis logic 340 for processing prior to passing the objects to the appropriate endpoint device(s) 200. In such an embodiment, sometimes called a "blocking deployment," the objects will only be passed to the appropriate endpoint device(s) 200 (e.g., the destination of the network traffic as identified in network traffic packets) if the analysis of the objects does not indicate that the objects are associated with malicious, anomalous and/or unwanted characteristics and/or behaviors.

The network interface(s) 310 and static analysis logic 320 may be located at the periphery of the private network 120. The periphery of a private network 120 may be located at or near the interconnect(s) 130 between the private network 120 and other networks, e.g., behind a firewall (not shown) on the private network 120. For example, the network interface(s) 310 and static analysis logic 320 components of the malware detection system are located at the private network periphery while the dynamic analysis logic 340, scoring logic (scorer) 370, classifying engine (classifier) 380, indicator generator 385 and reporting engine 390 are each located on a remote server on the private network 120 or on a public network 110 connected to the private network 120 via interconnects 130. Alternatively, all of these components may be co-located at or near the periphery of the private network 120.

The static analysis logic 320 may receive the network traffic to then extract the objects and related metadata, or may receive the objects and related metadata from the network interface(s) 310 already extracted. The term "object" generally refers to a collection of data, whether in transit (e.g., over a network) or at rest (e.g., stored), often having a logical structure or organization that enables it to be classified for purposes of analysis. The static analysis logic 320 may provide the objects to the indicator scanner 330 to identify if the objects match known indicators of malware. The term "indicator" (or "signature") designates a set of characteristics and/or behaviors exhibited by one or more malware that may or may not be unique to the malware. Thus, a match of the signature may indicate to some level of probability that an object constitutes malware. In some contexts, those of skill in the art have used the term "signature" as a unique identifier or "fingerprint." For example, a specific malware or malware family, may be represented by an indicator which is generated, for instance, as a hash of its machine code, and that is a special sub-case for purposes of this disclosure. The indicator scanner 330 may incorporate, in memory (not separately shown), a database of known malware indicators. The database of known malware indicators may be updated by receiving through the network interface(s) 310 from the public network 110 or the private network 120, via network interconnects 130, new indicators of malware. The database of indicators may also be updated by the indicator generator 385.

The heuristics engine 335 determines characteristics of the objects and/or network traffic, such as formatting or patterns of their content, and uses such characteristics to determine a probability of maliciousness. The heuristic engine 335 applies heuristics and/or probability analysis to determine if the objects might contain or constitute malware. Heuristics engine 335 is adapted for analysis of certain portions of the network traffic under analysis (e.g., the object may include a binary file) to determine whether a portion corresponds to either: (i) a "suspicious" identifier such as either a particular Uniform Resource Locator "URL" that has previously been determined as being associated with known malware, a particular source or destination (IP or MAC) address that has previously been determined as being associated with known malware; or (ii) a particular malware pattern. The heuristics engine 335 may be adapted to perform comparisons of an object under analysis against one or more pre-stored (e.g., pre-configured and/or predetermined) attack patterns stored in memory (not shown). The heuristics engine 335 may also be adapted to identify deviations in messaging practices set forth in applicable communication protocols (e.g., HTTP, TCP, etc.) exhibited by the traffic packets containing the object, since these deviations are often characteristic of malware. A match of an identifier may indicate, to some level of probability, often well less than 100%, that an object constitutes malware. The identifiers may represent identified characteristics (features) of the potential malware. The heuristics engine 335 may include scoring logic to correlate one or more characteristics of potential malware with a score of maliciousness, the score indicating the level of suspiciousness and/or maliciousness of the object. In one embodiment, when the score is above a first threshold, the heuristic engine 335 may generate an alert that the object is malicious. When the score is greater than a second threshold but lower than the first threshold, the object may be provided to the static analysis logic and/or the dynamic analysis logic for further analysis. When the score is less than the second threshold, the threat detection system may determine no further analysis is needed (e.g., the object is benign).

For dynamic analysis, the static analysis engine 320 provides the object to the scheduler 350. The scheduler 350 is responsible for provisioning and instantiating a virtual machine to execute the object at a schedule time. In some embodiments, the heuristic module 335 transmits the metadata identifying a destination device to the scheduler 350, which can then provision a virtual machine with software (operating system (OS) and one or more applications) and other components appropriate for execution of the network data (data packets or objects), which in some cases are those associated with the destination device. In other embodiments, the scheduler 350 receives one or more data packets of the network traffic from the network interface(s) 310 and analyzes the one or more data packets to identify the destination device. A virtual machine is executable software that is configured to mimic the performance of a device (e.g., the destination device).

The scheduler 350 can configure the virtual machine to mimic the pertinent performance characteristics of a destination device. The virtual machine can be provisioned from the store of software profiles 355. In one example, the scheduler 350 configures the characteristics of the virtual machine to mimic only those features of the destination device that are affected by an object to be executed (opened, loaded, and/or executed) and analyzed. Such features of the destination device can include ports that are to receive the network data, select device drivers that are to respond to the network data and any other devices coupled to or contained within the destination device that can respond to the network data. In other embodiments, the dynamic analysis logic 340 may determine a software profile, and then configures one or more virtual machine(s) 360 with the appropriate ports and capabilities to receive and execute the network data based on that software profile. In other examples, the dynamic analysis logic 340 passes the software profile for the network data to the scheduler 350 which either selects from the store of software profiles 355 or configures the virtual machine based on that profile.

The store of software profiles 355 is configured to store virtual machine images. The store of software profiles 355 can be any storage capable of storing software. In one example, the store of software profiles 355 stores a single virtual machine image that can be configured by the scheduler 350 to mimic the performance of any destination device on the private network 120. The store of software profiles 355 can store any number of distinct virtual machine images that can be configured to simulate the performance of any destination devices when processed in one or more virtual machine(s) 360.

The processing of an object may occur within one or more virtual machine(s), which may be provisioned with one or more software profiles. The software profile may be configured in response to configuration information provided by the scheduler 350, information extracted from the metadata associated with the object, and/or a default analysis software profile. Each software profile may include a software application and/or an operating system. Each of the one or more virtual machine(s) 360 may further include one or more monitors (not separately shown), namely software components that are configured to observe, capture and report information regarding run-time behavior of an object under analysis during processing within the virtual machine. The observed and captured run-time behavior information as well as effects on the virtual machine, otherwise known as features, along with related metadata may be provided to a scoring logic 370.

The scoring logic 370 generates a score used in a decision of maliciousness by the classification engine 380. The score may be a probability value (expressed in any of various ways such as, for example, a numerical value or percent) or other indicator (quantitative or qualitative) of security risk or so-called threat level. The determination of the score of the object processed by the malware detection system 300 may be based on a correlation of each of the features identified by the static analysis logic 320 and dynamic analysis logic 340 respectively. The features are the results of different analyses of the objects. The features may include characteristics, where characteristics include information about the object that do not require execution or "running" of the object. Characteristics may include metadata associated with the object, anomalous formatting or structuring of the object. The features may also include behaviors, where behaviors include information about the object and its activities during its execution or processing. Behaviors may include, but are not limited to, attempted outbound communications over a network connection or with other processes, patterns of activity or inactivity, and/or attempts to access system resources.

The scoring logic 370 may correlate one or more characteristics and monitored behaviors (features) with a weight of maliciousness. The weight of maliciousness reflects experiential knowledge of the respective features (characteristics or monitored behaviors) with those of known malware and benign objects. For example, during processing, the dynamic analysis logic 340 may monitor several behaviors of an object processed in the one or more virtual machine(s) 360, where, during processing, the object (i) executes a program, (ii) the program identifies personally identifiable data (e.g. login information, plain-text stored passwords, credit information), (iii) the program generates and encrypts the data in a new file, (iv) the program executes a network call, and (v) sends the encrypted data via the network connection to a remote server (exfiltrates the data). Each individual event may generate an independent score, weighted by the scoring logic 370, the weight based on experiential knowledge as to the maliciousness of each associated event. The individual scores or a combined score may be provided to the classifying engine 380. Alternatively, in some embodiments, the generation of a combined score may be performed by the classifying engine 380, or the scoring logic 370 and classifying engine 380 may be combined into a single engine.

The classifying engine 380 may be configured to use the scoring information provided by scoring logic 370 to classify the object as malicious, suspicious, or benign. In one embodiment, when the score is above a first threshold, the heuristic engine 335 may generate an alert that the object is malicious. When the score is greater than a second threshold but lower than the first threshold, the object may be provided for further analysis to the static analysis logic and/or the dynamic analysis logic for further analysis. When the score is less than the second threshold, the classifying engine 380 may determine no further analysis is needed (e.g., the object is benign). The threshold of maliciousness may be fixed, modified by as security administrator, and/or modified based on network conditions (for example, if a network is experiencing anomalous network conditions, if many other clients of a similar type are under confirmed attack, etc.). The classifying engine 380 may be configured to classify the object based on the characteristics identified by the static analysis logic 320 and/or the behaviors (expected and unexpected/anomalous) monitored by the dynamic analysis logic 340. In some embodiments, the classifying engine 380 may use only the correlation information provided by the scoring logic 370. That is, a determination of whether the monitored behaviors represent expected or unexpected (anomalous) behaviors is rendered by correlating the monitored behaviors against behaviors of known malware. Results of the static analysis may also be used in the correlation and classification, e.g., by being combined with the results of the dynamic analysis to yield a combined score. In an embodiment, further static analysis and/or dynamic analysis may be performed at the MDS 300 based on the results of correlation and classification engines.

In some embodiments, the classifying engine 380 may provide objects classified as malicious to the indicator generator 385, which may then generate indicators associated with these malicious objects. Additionally, the indicator generator 385 may receive non-malicious objects to generate a suitable indicator associated with non-maliciousness. In some embodiments, the indicators may be "fingerprint" type signatures, formed as a hash of the object. Alternatively, or in addition, the indicators may include identification of observed features, including characteristics and behaviors. The indicators thus generated may be provided to the security logic engine 400 for further enhancement (e.g., with additional indication of features) using results provided by endpoint devices 200. The classifying engine 380 may alternatively bypass the indicator generator 385 if it determines that the analyzed object is not malicious. The indicators may be provided to the indicator scanner 330 for use in inspecting (by scanning) subsequently received objects. In some embodiments, the indicator generator 385 may also distribute the indicators to the endpoint devices 200 and/or the security logic engine 400.

If the malware detection system classifies the object as malicious based on a static analysis results and/or dynamic analysis results, the reporting engine 390 may signal to a network or security administrator for action by an appropriate alert. In an embodiment, the reporting engine 390 may report the indicators ("signatures") of detected behaviors of a process/object as indicative of malware and organize those indicators as reports for distribution to the endpoint devices 200.

As noted previously, the reporting logic 390 may be configured to generate an alert for transmission external to the malware detection system 300 (e.g., to one or more other endpoint devices 200, to the security logic engine 400, and/or to a network manager). The reporting logic 390 is configured to provide reports via the network interface(s) 310. The security logic engine 400, when external to the MDS 300, e.g., may be configured to perform a management function or a management system may be provided, depending on the embodiment, e.g., to distribute the reports to other MDS within the private network, as well as to nodes within a malware detection services and/or equipment supplier network (e.g., supplier cloud infrastructure) for verification of the indicators and subsequent distribution to other malware detection system and/or among other customer networks. Illustratively, the reports distributed by the management function or system may include the entire or portions of the original indicator reports provided by the MDS 300, or may include new versions that are derived from the original reports.

Security Logic Engine

Figure 4:
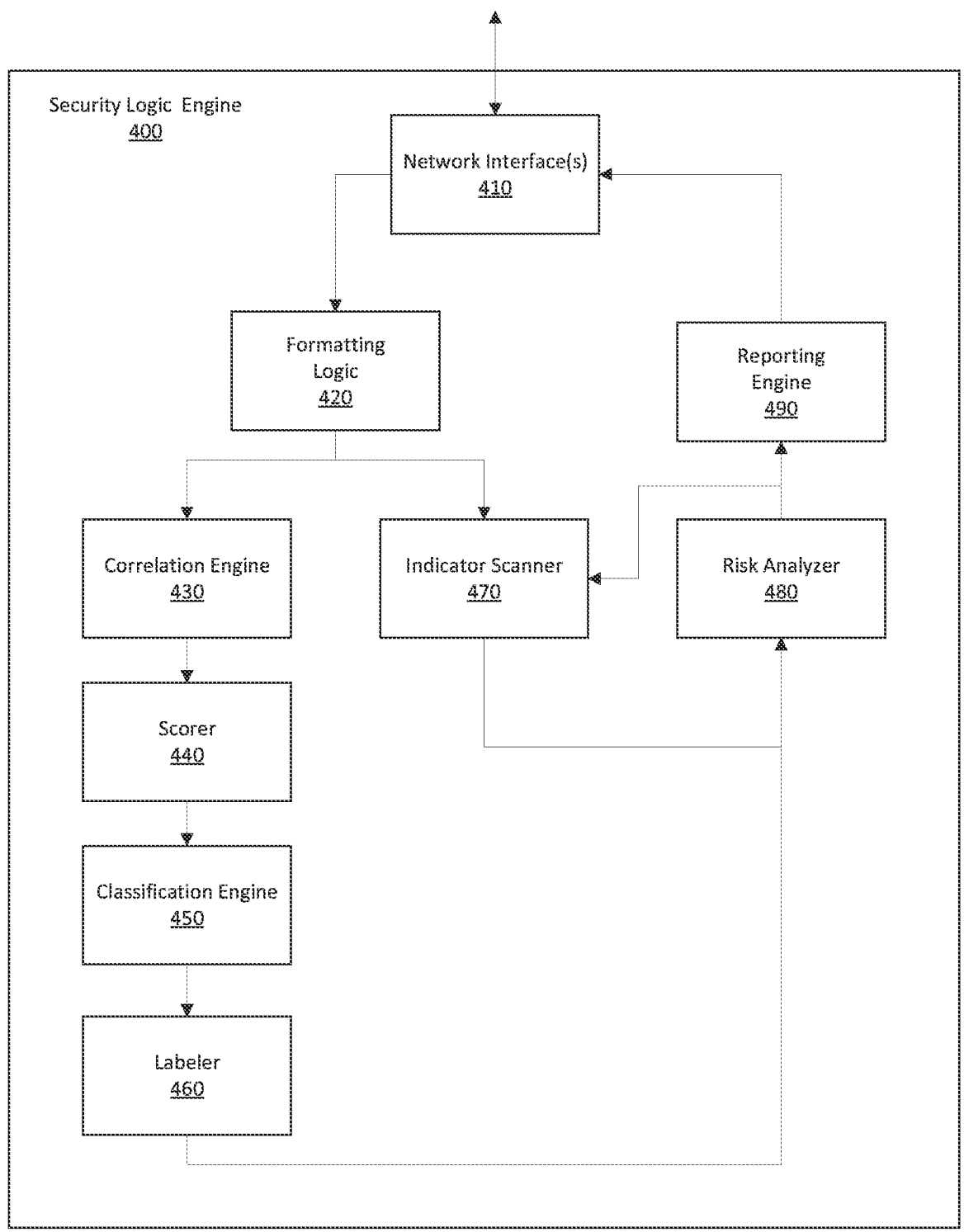
FIG. 4 is a block diagram of a security logic engine in accordance with one or more embodiments described herein.

As shown in FIG. 4, an embodiment of the security logic engine 400 includes a network interface(s) 410, a formatting logic 420, a correlation engine 430, a scoring logic (scorer) 440, a classification engine 450, a labeler 460, an indicator scanner 470, a risk analyzer 480, and a reporting engine 490. Generally speaking, the security logic engine 400 may be implemented as one or more network-connected electronic devices, which include(s) physical hardware comprising hardware processor(s), network interface(s), a memory, a system interconnect, an optional user interface, a system interconnect, arranged and organized as shown in FIG. 2. Each of the logic and engine components (including those just listed above) of the security logic engine 400 may be implemented as computer programs or modules executed by one or more processors and stored in memory.

The network interface(s) 410 can be coupled to a network such as private network 120 (FIG. 1) via the network interconnects 130. The network interface(s) 410 may support communication over a conventional link, such as over an Ethernet connection, USB connection, a FireWire connection, a serial connection, a parallel connection, or an ATA connection. The communication network interface(s) 410 may also support wireless communication (e.g., 802.11 a/b/g/n or wireless USB). It will be apparent to those skilled in the art that the communication network interface(s) 410 can support many wired and wireless standards. Where the SLE 400 is implemented within the MDS 300 and thus availed of network interface(s) 310, the network interface(s) 410 may be eliminated or disabled.

In some embodiments, a formatting logic 420 receives communication data from the network interface(s) 410 (or 310 of FIG. 3) and converts the data into a standardized format to be processed by other modules in the security logic engine 400 if not already in a suitable format. In general, the formatting logic 420 obtains data in disparate formats, which may often be device specific (e.g. an intermediary network device 140, malware detection system 300, endpoint device 200, etc.) or application version specific (e.g., endpoint device agent 250 may provide a particular format in version 1.0 and a different format in version 2.0), and transforms the data into a readily consumable, common format. For example, the formatting logic 420 may transform data associated with a first endpoint device agent 250 to that of a common data format (e.g. JSON, etc.,) such that any ensuing analysis and correlation may be provided using a common data format.

The correlation engine 430 may correlate the features received by the security logic engine 400 from an endpoint device 200 and the malware detection system 300 with known behaviors and characteristics of benign and malicious objects. Additionally, the correlation engine 430 may correlate the features received from the endpoint device 200 with those received from the malware detection system 300 to verify the determination of maliciousness obtained by the malware detection system 300 or determine the extent to which the features from these two vantage points (network periphery and endpoint) correlate with one another. The correlations just described in the preceding two sentences can be performed separately or in the same operation depending on the implementation, and in other embodiments one or the other may be eliminated altogether.

The results of the correlation performed by the correlation engine 430 may be provided to a scorer 440. The scorer 440 may generate a score based on each correlation of an observed feature with known behaviors and characteristics of benign and malicious objects. The classification engine 450 may utilize the scores generated by the scorer 440 to classify the object as malicious if it exceeds a threshold. The threshold may be fixed or dynamic. The maliciousness threshold may be "factory-set," "user-set," and/or modified based on information received via a network interface(s) 410.

The correlation engine 430 may be configured, depending on the embodiment, (a) to verify a classification of maliciousness made by the malware detection system 300, (b) to provide greater or lesser confidence that an object processed by the malware detection system 300 should be classified as malware, and/or (c) to determine whether the endpoint device 200 has received and is processing malware, and if so, whether the malware is the same as that found by the malware detection system 300. The first of these requires the correlation engine 430 to correlate at least the results of the malware detection system 300 with those of the endpoint device 200. The last of these requires that the correlation engine 430 correlate the features reported by the endpoint device 200 with those of known malware, and compare the correlation results with those obtained by the malware detection system 300.

For example, the correlation engine 430 may receive, over a communication network via network interface(s) 410, (i) a feature set (features including behaviors and, in some embodiments, characteristics) monitored by the endpoint device agent 250, and (ii) a feature set (features including behaviors and, in some embodiments, characteristics) associated with an object classified by the malware detection system as malware, and in some embodiments, the associated score or threat level determined by the MDS. The correlation engine 430 may correlate the feature sets received from the endpoint device 200 and the MDS 300 to determine whether the endpoint 200 observed the same or similar features to those monitored in the MDS 300 on which its classification decision was based, and may also correlate those feature sets with features exhibited by known malware and/or malware families. In so doing, the correlation engine 430 may apply correlation rules to determine whether the feature sets separately (or those common features of the feature sets) indicate or verify the object as malware. The correlation rules may define, among other things, patterns (such as sequences) of known malicious behaviors, and, in some embodiments, also patterns of known benign behaviors. For example, in looking at patterns, a behavior may be detected that appears benign, but when examined with other behaviors, may be indicative of malicious activity.

The scorer 440 generates a risk level or numerical score used in a decision of maliciousness by the classification engine 450. The score may be a probability value (expressed in any of various ways such as, for example, a numerical value or percent) or other indicator (quantitative or qualitative) of security risk or threat level. The determination of the risk level of the object processed by the MDS 300 and observed by the endpoint device 200 may be based on monitored events used by the correlation engine 430, inter alia, (i) the location from where the object originated (e.g., a known website compared to an unknown website), (ii) the processed object spawned a new process, and/or (iii) actions taken by received objects during processing (e.g., executable code contained in objects attempts to execute a callback). An object with an associated score (value) above a first threshold may indicate a suspicious object, i.e., an object with a certain probability of being malicious, and above a second, higher threshold may indicate that object should be classified as malware, i.e., an object with a high probability of being malicious. In some embodiments, the scorer 440 may increase or decrease a score provided by the MDS 300 or may generate its own score based on all the available features of the feature sets. For example, if the results of the correlation of monitored behaviors from the endpoint device 200 and the MPS 300 and, in some embodiments, features associated with known malware, reveal a level of similarity above a first predetermined threshold (e.g., 60% or 70%), the scorer 440 may so indicate in its score. The security logic engine 400 may classify the object as malware in response to the score generated by the scorer 440.

Accordingly, the classification engine 450 may be configured to use the correlation information provided by correlation engine 430 and the score provided by a scorer 440 to render a decision as to whether the object is malicious. Illustratively, the classification engine 450 may be configured to classify the correlation information, including monitored behaviors and characteristics, of the object relative to those of known malware and benign content. If a first probability of attack (score) is received by the security logic engine 400 from a malware detection system 300 and differs by a threshold amount or falls beyond a comparison "range-"from the probability of attack (score) as determined by the classification engine 450, the security logic engine 400 may generate a second classification (the classification generated by the classification engine 450), and provide the second classification to the malware detection system 300 and report the second classification in an alert. The threshold or comparison range may be fixed, and/or based on a percent of the initial classification by the malware detection system 300.

In an embodiment, the security logic engine 400 may include a labeler 460 configured to add names of malware or malware families to indicators (signatures) of malware. The labeler 460 may define a new malware family or add the identified malware to the malware family bearing the greatest similarity to the identified malware. The similarity may be based on a correlation, conducted by the correlation engine 430 or the labeler 460, of the identified malware behaviors with a database (not shown) of malware family entries and associated behaviors. Alternatively, the association of a malware family may be implemented in a separate module. The malware detection system 300 may update the indicator scanner 330 using the enhanced indicators generated by the labeler 460. These indicators may be used internally by the indicator scanner 470 of the security logic engine 400 or distributed externally as part of indicator reports to the malware detection system (s) 300 or endpoint device(s) 200.

The indicator scanner 470 receives, authenticates, and stores malware indicators, and scans results received from the malware detection system 300 and results received from an endpoint device 200 to determine, when they match, that the object under analysis is malicious. The indicator scanner 470 may also generate enhanced indicators based on the additional information received from the endpoint device 200.

The risk analyzer 480 determines the risk of harm to private network 120 from a verified malicious object based on the results provided by the classification engine 450 and labeler 460 and the indicator scanner 470. The risk analyzer 480 may base the risk of harm on information retrieved from a database regarding named malware or malware families. More specifically, the risk analyzer 480 may receive information about the object from the classification engine 450 and/or the labeler 460, which may also provide the observed behaviors from an endpoint device 200 and a malware detection system 300 as well as a malware family names identified malware names. The risk analyzer 480 may also retrieve information from the network or be provided with information about network device properties (e.g. network location, connected users, operating system version, etc.) for use in its risk assessment. The risk analyzer 480 may also receive a classification of the malware from the classification engine 450 or the signature matcher 470. The risk analyzer 480 determines a risk to the private network 120 using experiential knowledge to correlate the information about the malicious object with the information about the network device properties. The correlation results in a risk profile for each endpoint device, which may be provided to a network administrator.

The risk analyzer 480 may identify endpoint device(s) 200 that may be affected by the cyber-attack involving the verified malicious object. The risk analyzer 480 may utilize the identified features and metadata of a verified malicious object to determine if the system configuration (where a system configuration may be characterized by its hardware and software profiles) of each endpoint device in the private network 120 is vulnerable to the attack. To determine the risk posed by the verified malicious object to each endpoint device 200, the risk analyzer 480 may correlate each feature and its metadata of the object (e.g., software profile running during processing of the object during which malicious behavior was observed) with system configuration attributes of the endpoints on the network. If an endpoint device system configuration correlates with the features and metadata of the verified malware, the risk analyzer 480 identifies the endpoint device as at risk to attack.

In some embodiments, the risk analyzer 480 may communicate to a malware detection system 300 that further analysis of the verified malicious object is necessary if the risk analyzer 480 cannot determine if the verified malicious object will behave maliciously when processed by endpoint device system configurations on the private network.

The risk analyzer 480 may issue alerts to particular network devices (e.g., endpoint devices, network storage servers being accessed by an endpoint device 200 with a verified malicious object present) to restrict access from network devices found to be correlated with a high risk and/or may issue alerts to a network or security administrator via the reporting engine 490.

The reporting engine 490 is adapted to receive information from the signature matcher 470 and the risk analyzer 480 to generate alerts that identify to a user of an endpoint device, network administrator or an expert network analyst the likelihood of verified network cyber-attack. Other additional information regarding the verified malware may optionally be included in the alerts. For example, additional reported information may partially comprise typical behaviors associated with the malware, particular classifications of endpoint devices or users that may be targeted, and/or the priority for mitigation of the malware's effects. Additionally, a user of an endpoint device that was to receive the objects and/or a network administer may be alerted to the results of the processing via alert generated by a reporting engine 490. The reporting engine 490 may also provide connected malware detection systems and endpoint devices 200, with updated information regarding malicious attacks and their correlation with particular behaviors identified by the security logic engine 400. Where the security logic engine is a component of the MDS 300, the reporting engine 490 may be eliminated or combined with reporting engine 390.

Figure 5:
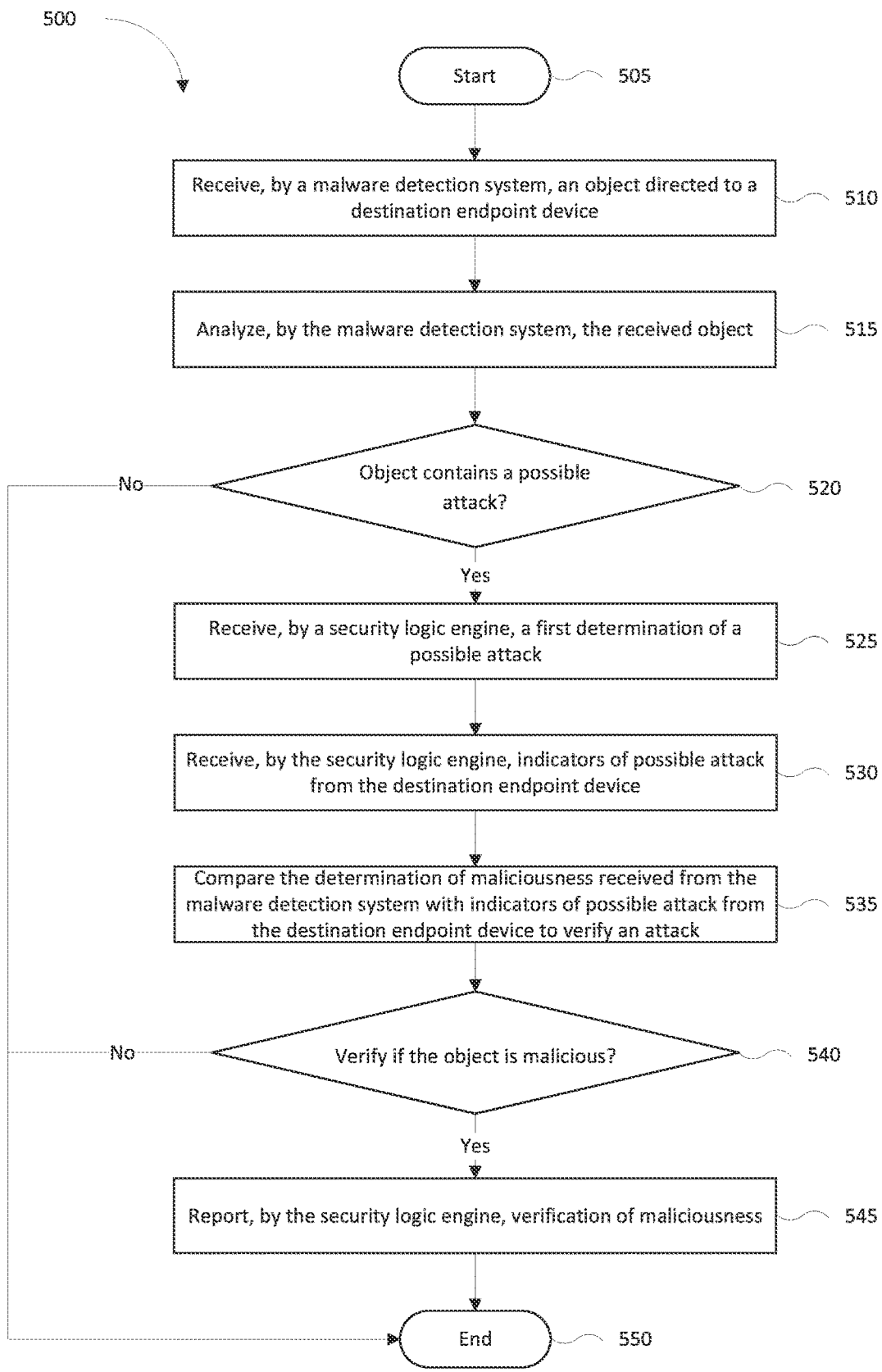
FIG. 5 is a flowchart of an exemplary method for cyber-attack verification in accordance with one or more embodiments described herein.

FIG. 5 is an example computerized method 500 for operating the malware threat detection verification system. The term "computerized" generally represents that operations are conducted by hardware in combination with executable software and/or firmware. The procedure 500 starts at step 505 and proceeds to step 510 where a malware detection system 300 receives network traffic directed to a destination device in the private network. The destination device may be an endpoint device 200, (e.g., a desktop computer, a network attached storage server, etc.). At step 515 the malware detection system 300 processes the received network traffic using at least the static analysis logic 320 and/or dynamic analysis logic 340 to determine if the object contains characteristics or behaviors indicative of malware. The dynamic analysis logic 340 may utilize a software profile from the software profile store 355. The software profile selected from the software profile store 355 may be chosen to mimic the original destination endpoint device or a default analysis software profile set by a security administrator. At step 520 the malware detection system 300 determines if the network traffic content (object) is malicious, based on the monitored characteristics and/or behaviors. If the processed content is determined to be benign by the malware detection system 300, the method may end at step 550. In some embodiments, if the malware detection system 300 identifies the processed network content as suspicious, it may provide its analysis results to the security logic engine 400 for further analysis and correlation with endpoint device results. If the processed content is determined to be malicious, and thus indicative of an attack, by the malware detection system 300 at step 520, the malware detection system 300 may provide its determination and associated information (e.g. a signature generated by the indicator generator 385, characteristics and/or monitored behaviors identified by the static analysis logic 320 and dynamic analysis logic 340 respectively, etc.) to the security logic engine 400.

At step 525 the security logic engine receives the determination of possible attack from the malware detection system 300, which may also include information collected by the malware detection system about the processed network content. At step 530 the security logic engine receives indicators (e.g., features) from possible attack on an endpoint device 200 as identified at the endpoint device by the associated agent 250. The endpoint device agent 250 may provide the security logic engine 400 with event information about the processing of the object by the endpoint device. The information provided to the security logic engine 400 by the endpoint device 200 may include an initial determination of maliciousness by the endpoint device classifier 260 and/or behaviors monitored by the agent 250. At step 535 the security logic engine 400 may compare the received information from the endpoint device 200 with known indicators using the indicator scanner 470. Alternatively, the security logic engine 400 may employ the correlation engine 430, scorer 440, and classification engine 450 to determine if the endpoint device monitored behaviors are malicious. If the endpoint device monitored behaviors are determined to be malicious, the risk analyzer 480 verifies the network content determined to be malicious by the malware detection system 300 is malicious.

The verification step 540 requires the security logic engine 400 to combine the features (identified characteristics and monitored behaviors of the suspicious object) detected by the malware detection system 300 with the monitored behaviors of the suspicious object on the endpoint device(s) 200. Combining the features detected by the malware detection system 300 and endpoint device(s) 200 may result in a verification of a first determination of maliciousness by the malware detection system 300. The monitored behaviors from the endpoint device(s) 200 may provide further details of a suspicious object's execution resulting from, for example, longer runtimes (than on the MDS 300), user interaction, and accessibility of particular resources. The combination of the malware detection system features and endpoint device behaviors may be performed by the correlation engine 430 to increase or decrease the correlation with maliciousness.

If the first determination of maliciousness is verified by monitoring behaviors on an endpoint device 200 with a similar software profile as that used by the malware detection system, the determination may be limited to associated software profiles. The security logic engine 400 may conduct further analysis using monitored behaviors from additional endpoint devices with different software profiles to determine if the object behaves maliciously on different software profiles.

If the malware is not verified as malicious in step 540 the procedure, then ends at step 550. If the malware is verified, the risk analyzer 480 determines the threat to the network resources (endpoint devices 200, servers, etc.) and at step 545 reports the results via the reporting engine 490. Once reported (e.g. by storing the result in the security logic engine 400, issuing an alert to a third party, issuing alerts to users or network managers, and/or issuing alerts to devices, etc.), the procedure ends at step 550.

Figure 6:
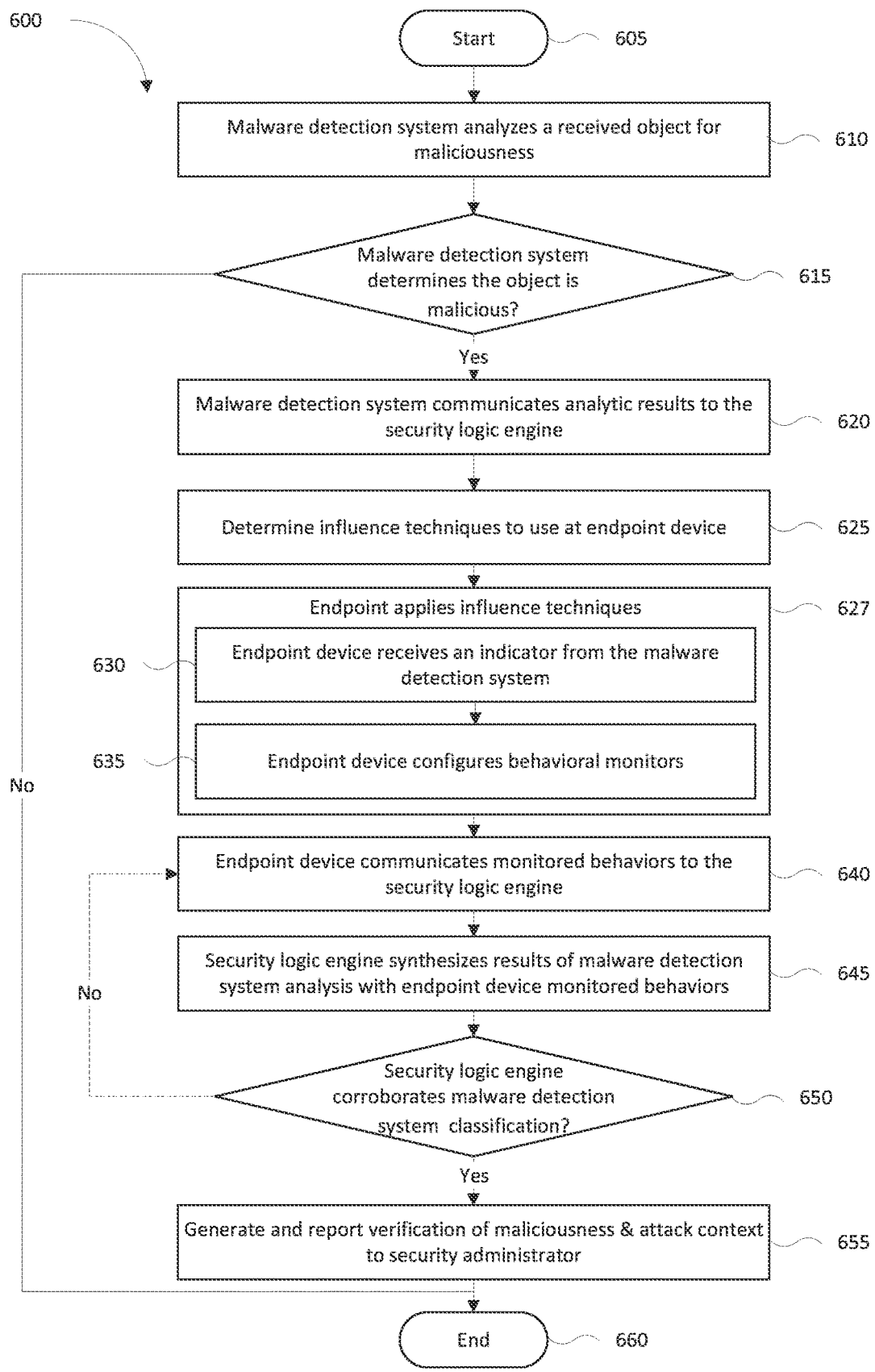
FIG. 6 is a flowchart of an exemplary method to configure improved techniques for enhanced cyber-attack detection in accordance with one or more embodiments described herein.

FIG. 6 represents another exemplary flowchart of a computerized method 600 for operating a malware threat detection verification system. The exemplary method 600 starts at step 605 and proceeds to step 610 where a malware detection system 300 analyzes a received object. In step 615 the malware detection system determines if the analyzed object is malicious. As described herein, the object is received in network traffic by the malware detection system and determined to be malicious based on an analysis by the system. If the malware detection system determines the object is not malicious (e.g. benign), the method ends at step 660.

If the malware detection system determines the received object is malicious (and, in some embodiments, suspicious), it may communicate with the security logic engine 400 and/or (depending on the embodiment) with an endpoint device 200 to verify the determination of maliciousness. If malware is detected in step 615, the malware detection system 300 communicates the result to a security logic engine 400 in step 620. In step 625 the malware detection system 300 may optionally determine if particular monitoring techniques that are within its capability to influence or request may be implemented at an endpoint device 200. The determination of additional monitoring techniques to be implemented by the endpoint device may be based on features identified by the malware detection system 300 in step 610 to determine if the object is malicious.

In step 627 of the exemplary method 600, the endpoint device 200 applies the "influence" techniques, e.g., the particular monitoring techniques requested by the MDS 300. Two of these are illustrated the following two steps: In step 630 the endpoint device 200 may optionally receive an indicator representing the malicious object from the malware detection system 300. The indicator can be a hash of the object found to be malicious by the malware detection system 300, which can be used to scan objects being processed by the endpoint device 200 to determined maliciousness. Also, the indicator can be descriptive of the features found to be malicious by the malware detection system 300 and can be used to identify an object processed in the endpoint that may be the same or similar to the object analyzed and found malicious by the malware detection system 300. In step 635, the endpoint device may optionally configure the behavioral monitors to detect the behaviors of the same (or similar) object on the endpoint device 200 or the behaviors specifically identified by the latter type of "feature" indicator. Responsive to the indicators, the endpoint device 200 may enable or disable monitors or configure or customize their operation.

The behaviors monitored by the endpoint device 200 in step 635 may be communicated to a security logic engine 400 in step 640. The monitored behaviors may be communicated periodically, or aperiodically, for example, when the malicious behavior is verified or alternatively when the endpoint device 200 has completed processing the malicious object. In step 645, the security logic engine 400 may combine the results of the analysis performed by the malware detection system 300 in step 610 with the monitored behaviors from endpoint device 200. The combination of the features in step 645 may be used to generate further correlations of those features with features of known malware.

If the further correlations with known malicious features exceed a threshold, as described herein, the security logic engine 400 in step 650 may corroborate the first determination of maliciousness from step 610. If the determination cannot be corroborated, the security logic engine 400 may await further monitored behaviors to be received from the endpoint device 200. In step 655 the security event analyzing logic 400 may report the verification of maliciousness to a security administrator for remediation and/or mitigation.

In one embodiment, an exemplary alert (e.g., an object, text message, display screen image, etc.), issued by step 655, is communicated to security administrators. For example, the alert may indicate the urgency in handling one or more predicted attacks based on the maliciousness of the verified malicious object. Furthermore, the alert may comprise instructions so as to prevent one or more predicted malware attacks.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the invention.

What is claimed is:

1. A security logic engine, including a memory and a processor, to determine whether a network, including a plurality of endpoint devices, is undergoing a cyber-attack, the security logic engine comprising:

correlation logic stored in the memory for execution by the processor, the correlation logic is configured to generate correlation results based on (i) a combination of monitored features including a first set of features associated with a first object included as part of inbound network traffic detected at a periphery of the network and generated based on analytics of the first object by a malware detection system and a second set of features generated based on analytics of the first object by one or more endpoint devices and (ii) a third set of features exhibited by a known malware or a known malware family;

a classification engine stored in the memory for execution by the processor, the classification engine is configured to generate classification results by determining, at least basal on the correlation results provided by the correlation logic, whether the first object is classified as a malicious object being part of the cyber-attack;

a risk analyzer stored in the memory for execution by the processor, the risk analyzer is configured to (i) receive the classification results when the first object is classified by the classification engine as a malicious object and (ii) correlate the combination of monitored features with information associated with properties associated with each of the plurality of endpoint devices, different than the malware detection system, to generate at least a risk profile for each of the plurality of endpoint devices, wherein each risk profile identifies whether a corresponding endpoint device is vulnerable to the cyber-attack.

2. The security logic engine of claim 1, wherein the risk analyzer is configured to restrict access by the corresponding endpoint device to resources of the network in response to the risk profile of the corresponding endpoint device identifying at least a prescribed vulnerability risk.

3. The security logic engine of claim 1 further comprising:
a reporting engine communicatively coupled to the risk analyzer, the reporting engine being configured to generate a first type of alert that identifies to (i) a user of the corresponding endpoint device, or (ii) a network administrator, or (iii) an expert network analyst, a likelihood of the cyber-attack being directed to the corresponding endpoint device.

4. The security logic engine of claim 3, wherein the risk analyzer is further configured to issue an alert to at least the corresponding endpoint device to restrict access by the corresponding endpoint device to resources of the network in response to the risk profile identifying at least a prescribed vulnerability risk.

5. The security logic engine of claim 1 further comprising:
a scorer to generate a score based on each correlation of a feature of the combination of monitored features associated with the first object with known behaviors and characteristics of benign and malicious objects, and
the classification engine to generate the classification results based on the correlation results and the scores generated for the combination of monitored features.

6. The security logic engine of claim 5, wherein the score is based on (i) a location from where the first object originated or (ii) the first object spawned a new process.

7. The security logic engine of claim 1, wherein the risk analyzer is configured to determine a risk to the network using experiential knowledge to correlate the combination of monitored features with the information for the properties associated with each of the plurality of endpoint devices.

8. The security logic engine of claim 1, wherein the risk analyzer is configured to communicate with the malware detection system to conduct a further analysis of the first object if the risk analyzer is unable to determine if the first object will operate as a malicious object when processed by an endpoint device of the plurality of endpoint devices.

9. A non-transitory computer-readable medium to determine whether a network, including a plurality of endpoint devices, is undergoing a cyber-attack, the non-transitory computer-readable medium including instructions that, when executed, cause execution of software components comprising:

correlation logic configured to generate correlation results based on (i) a combination of monitored features including a first set of features associated with a first object included as part of inbound network traffic detected at a periphery of the network and generated based on analytics of the first object by a malware detection system and a second set of features generated based on analytics of the first object by one or more endpoint devices and (ii) a third set of features exhibited by a known malware or a known malware family;

a classification engine configured to generate classification results by determining, at least based on the correlation results provided by the correlation logic, whether the first object is classified as a malicious object being part of the cyber-attack; and a risk analyzer configured to receive the classification results when the first object is classified by the classification engine as a malicious object and correlate the combination of monitored features with information associated with properties associated with each of the plurality of endpoint devices, different than the malware detection system, to generate at least a risk profile for each of the plurality of endpoint devices, wherein each risk profile identifies whether a corresponding endpoint device is vulnerable to the cyber-attack.

10. The non-transitory computer-readable medium of claim 9, wherein the risk analyzer is configured to restrict access by the corresponding endpoint device to resources of the network in response to the risk profile of the corresponding endpoint device identifying at least a prescribed vulnerability risk.

11. The non-transitory computer-readable medium of claim 9 further comprising:
a reporting engine communicatively coupled to the risk analyzer, the reporting engine being configured to generate a first type of alert that identifies to (i) a user of the corresponding endpoint device, (ii) a network administrator or (iii) an expert network analyst, a likelihood of the cyber-attack being directed to the corresponding endpoint device.

12. The non-transitory computer-readable medium of claim 11, wherein the risk analyzer is further configured to issue an alert to at least the corresponding endpoint device to restrict access by the corresponding endpoint device to resources of the network in response to the risk profile identifying at least a prescribed vulnerability risk.

13. The non-transitory computer-readable medium of claim 9 further comprising:
a scorer to generate a score based on each correlation of a feature of the combination of monitored features associated with the first object with known behaviors and characteristics of benign and malicious objects, and
the classification engine to generate the classification results based on the correlation results and the scores generated for the combination of monitored features.

14. The non-transitory computer-readable medium of claim 13, wherein the score is based on (i) a location from where the first object originated or (ii) the first object spawned a new process.

15. The non-transitory computer-readable medium of claim 9, wherein the risk analyzer is configured to determine a risk to the network using experiential knowledge to correlate the combination of monitored features with the information for the properties associated with each of the plurality of endpoint devices.

16. The non-transitory computer-readable medium of claim 9, wherein the risk analyzer is configured to communicate with the malware detection system to conduct a further analysis of the first object if the risk analyzer is unable to determine if the first object will operate as a malicious object when processed by an endpoint device of the plurality of endpoint devices.

* * * * *